United States Patent [19]

Briggs

[11] 4,217,981
[45] Aug. 19, 1980

[54] CONVEYING APPARATUS

[75] Inventor: Aubrey C. Briggs, Carnegie, Pa.

[73] Assignee: Dravo Corporation, Pittsburgh, Pa.

[21] Appl. No.: 260,312

[22] Filed: Jun. 6, 1972

[51] Int. Cl.$^2$ ............................................. B65G 15/60
[52] U.S. Cl. .................................................. 198/839
[58] Field of Search ............... 198/108, 129, 184, 457, 198/839

[56] References Cited

U.S. PATENT DOCUMENTS

| 983,669 | 2/1911 | Beier | 198/187 |
|---|---|---|---|
| 3,151,732 | 10/1964 | Oury | 198/92 |
| 3,203,536 | 8/1965 | Shaw | 198/184 |

FOREIGN PATENT DOCUMENTS

| 58259 | 8/1967 | Denmark | 198/108 |
|---|---|---|---|
| 575283 | 7/1924 | France | 198/186 |

Primary Examiner—Joseph E. Valenza
Attorney, Agent, or Firm—Parmelee, Miller, Welsh & Kratz

[57] ABSTRACT

A conveying apparatus having a work portion including two work runs disposed to travel at an angle to each other is disclosed. The apparatus includes means for guiding the work portion of an endless conveyor belt whereby first and second work runs lying at an angle to each other and connected by a downwardly extending loop are provided. The guide means is further arranged such that the discharge end of the first work run lies in a plane above the receiving end of the second work run. Means for driving the conveyor belt, and guide means for guiding the return run of the belt are also provided.

5 Claims, 9 Drawing Figures

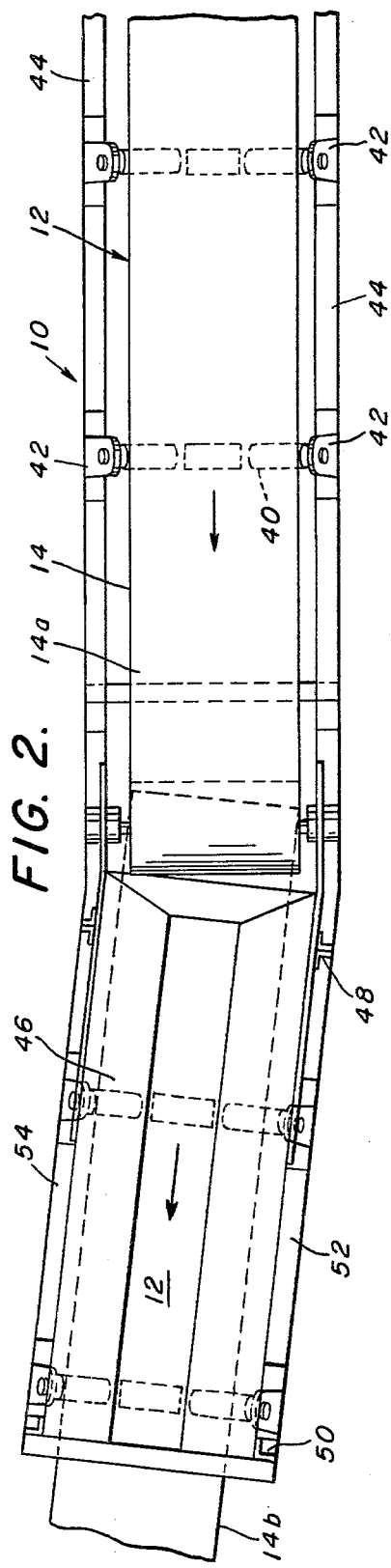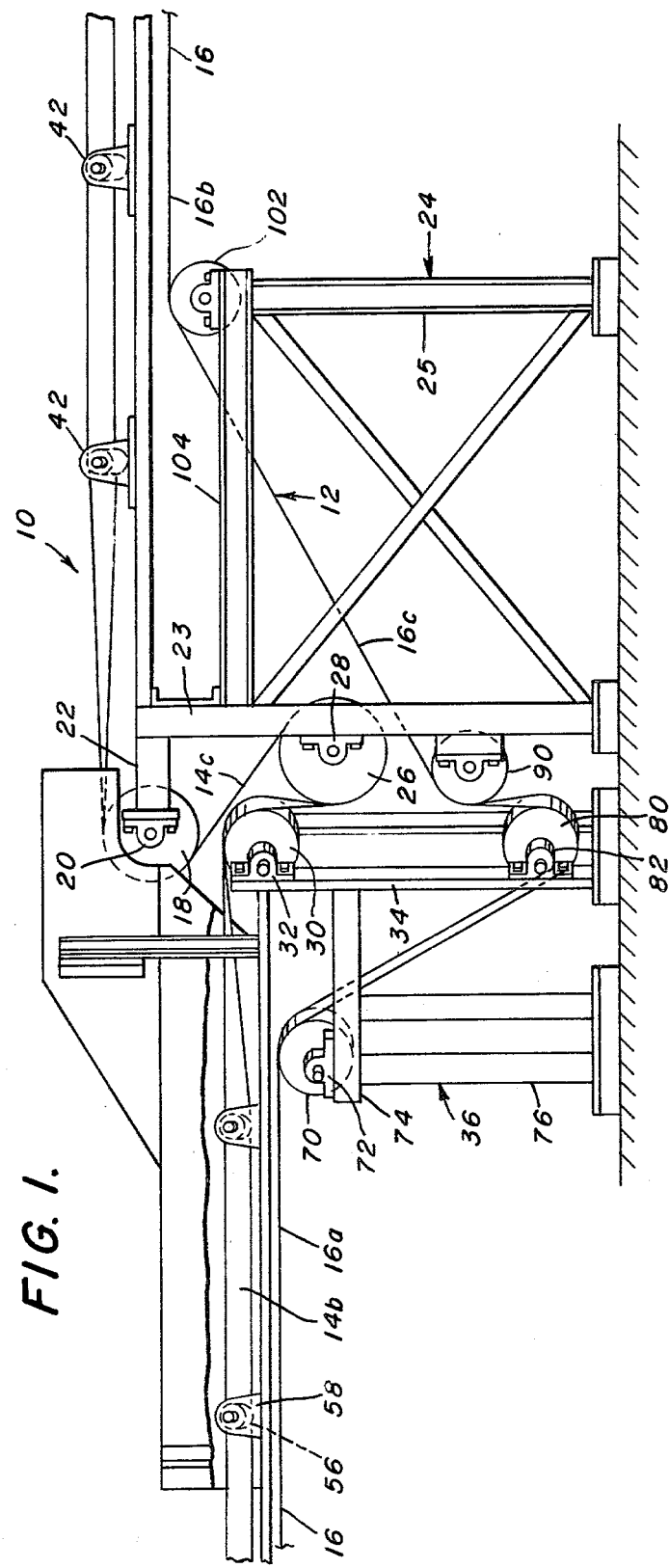

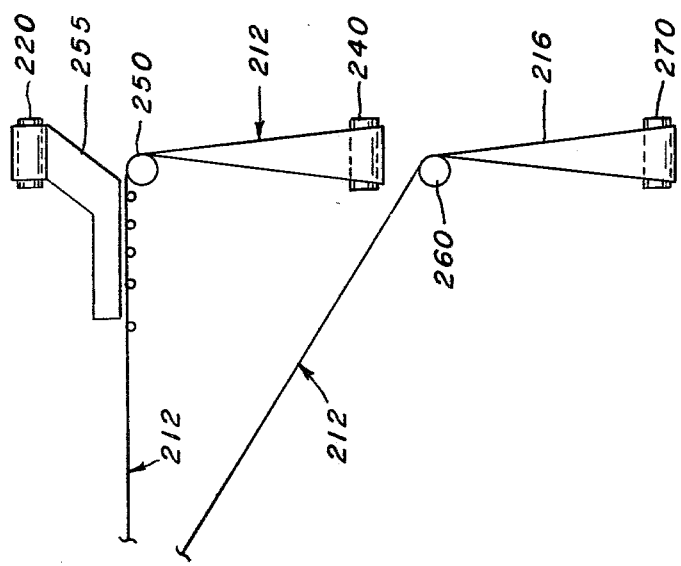
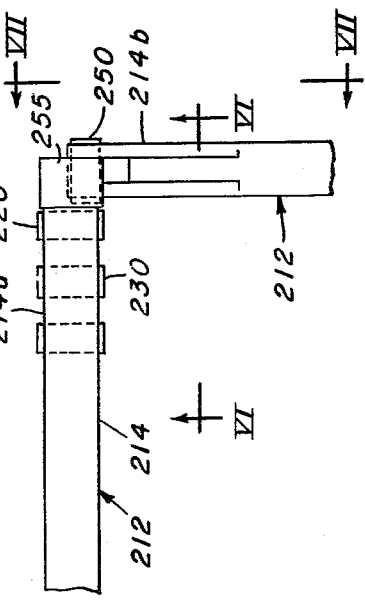
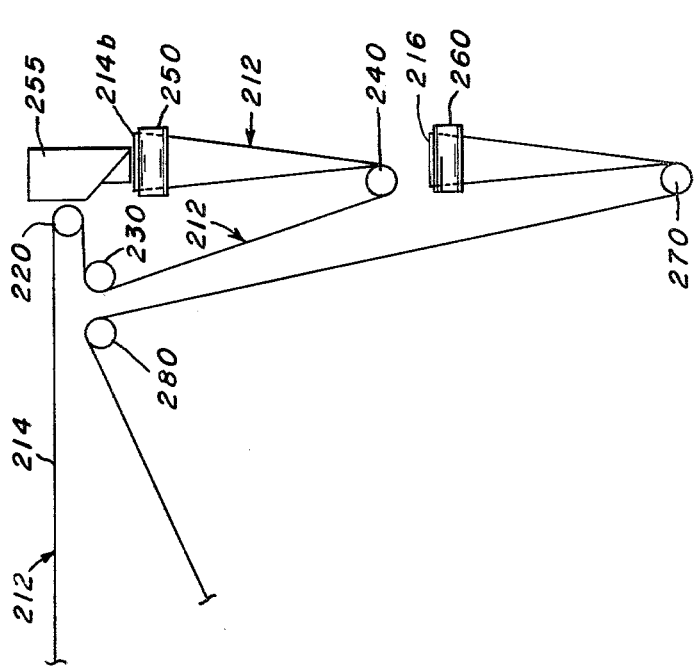
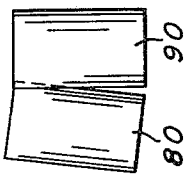
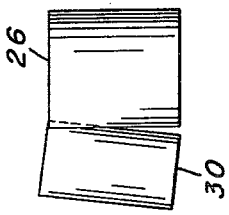

CONVEYING APPARATUS

This invention relates to a conveying apparatus by which articles or material carried along one line of movement are changed in direction to a line of travel at an angle thereto.

In many applications for conveying articles or material from one point to another a need often arises to change the direction of travel of the conveyor. Such a need exists in conveying mined ore and excavated soil. A common manner for providing change in direction of the conveyor systems used for transporting aggregate material has been to provide multiple individual endless conveyor belt assemblies and to position the assemblies at angles to each other as needed. Thus, one conveyor assembly would be set up where it would discharge material onto the receiving end of another assembly having its line of travel at an angle to that of the first assembly. Such a multiple conveyor assembly system is undesirable mainly because each assembly requires its own drive mechanism necessarily making it an expensive system. Such multiple assembly systems, because of the drive mechanism requirements, also require that one assembly be disposed with its discharge end raised high above the receiving end of the next downstream assembly. This spacing arrangement is necessary to make room for the drive mechanisms. Thus, the conveyors had to work uphill to get to the next transfer point, and as a result more power was required than would be needed for a horizontally disposed conveyor, making the assembly expensive to operate.

Conveyor assemblies have been proposed for changing direction of travel of the conveyor without necessitating multiple conveyor assemblies. One such system is disclosed in British Pat. No. 1,048,256. The British system uses a single endless conveyor belt with a multiple roller arrangement for changing the direction of travel of the belt. The British roller arrangement includes a plurality of caster mounted rollers disposed side-by-side. The British system is an expensive one to build. Moreover, the multiple rollers place point contacts on the conveyor belt which is undesirable since it could cause rapid wear of the belt or even cause the belt to rupture during use.

My present invention overcomes the above stated disadvantages of the heretofore used angular conveying systems by providing a conveying apparatus which uses a single endless conveyor belt and requires but one drive mechanism. In addition, my invention allows the work runs of the conveyor to operate in horizontal planes thereby avoiding increased power requirements of the drive mechanism as would be necessary to the conveyor runs disposed at an upward incline. Simply stated, my invention provides an arrangement of elongated idler rollers or pulleys whereby the axes of rotation of the pulleys are disposed to provide the desired turns in the conveyor runs. More particularly, I provide a conveyor apparatus preferably comprising: an endless conveyor belt having an upper work portion and a lower return portion; single drive means for the conveyor belt; at least one first guide means for guiding the upper work portion of the belt to provide first and second work runs lying at an angle to each other, the discharge end of the first work run lying in a plane above the receiving end of the second work run, with the work runs being connected by a downwardly extending loop; the first guide means including a first elongated guide member at the discharge end of the first work run, a second elongated guide member at the receiving end of the second work run with the longitudinal axis of the second guide member being at an angle with respect to the longitudinal axis of the first guide member, and at least one other elongated guide member disposed below the second guide member with the longitudinal axis of the other guide member being generally parallel to the axis of the first guide member, the guide members being arranged and constructed to hold the loop taut; and at least one second guide means for guiding the return run of the conveyor belt. The return portion guide means is preferably a series of rollers or pulleys arranged to provide return runs having paths of travel lying in planes generally parallel to the planes of the paths of travel of the work runs. The preferred embodiment of my present invention also includes a deflector arranged to guide material from the discharge end of the upper work run onto the receiving end of the lower work run. By virtue of my invention multiple runs may be provided along a single endless conveyor with the turns being at any desired angle between small angles (viz 6 degrees) and 90 degrees. Also, the distance between the discharge end of the upper work run and receiving end of the lower work run is reasonably short as compared to the similar spacing in the multiple individual conveyor assembly systems. The short drop conserves conveyor belt life by avoiding the heavy impact of material on the lower belt resulting from a large distance at the transfer points.

Various other details and advantages of this invention will become apparent as the following description of a present preferred embodiment thereof proceeds.

In the accompanying drawings I have shown a present preferred embodiment of this invention in which:

FIG. 1 is a side elevation view of a single endless belt conveying apparatus embodying one form of my present invention, with the remote ends of the apparatus not being shown for purposes of simplifying the illustration;

FIG. 2 is a plan view of the conveying apparatus of FIG. 1;

FIG. 5 is a generally schematic plan view of a conveying apparatus embodying my present invention showing a 90 degree transfer angle;

FIG. 6 is a view looking along the line VI—VI of FIG. 5;

FIG. 7 is a view looking along the line VII—VII of FIG. 5; and

FIGS. 8 and 9 are diagrammatic plan views of certain of the pulleys of the work and return portion guide means, respectively, of the apparatus of FIGS. 1 and 2, showing the angular relationship between those pulleys.

Figure 3:
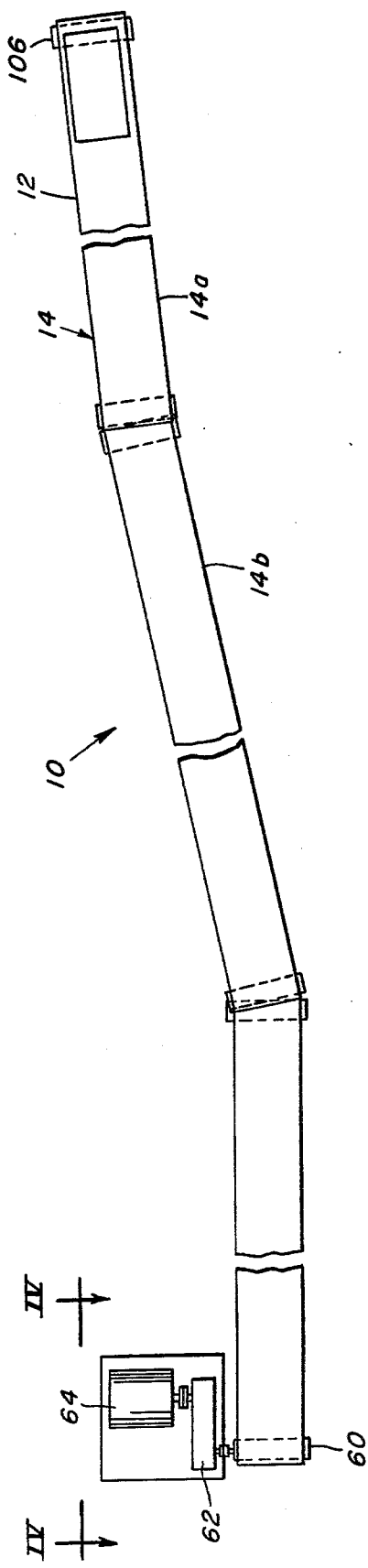
FIG. 3 is a generally diagrammatic plan view of a conveying apparatus embodying my present invention, showing multiple angular transfers with a single drive mechanism for driving the endless belt.

Referring now to the drawings and particularly to FIGS. 1, 2, 8 and 9, there is shown a conveying apparatus embodying my present invention and generally designated by the numeral 10. Conveying apparatus 10 includes a single endless conveyor belt 12 formed of a suitable rubber material reinforced with steel, for example. The conveyor belt 12 has a work portion 14 and a lower return portion 16 which travels in a direction opposite to that of the work portion. The work portion 14 is shown arranged as having an upper work run 14a disposed to travel along a path and a lower work run 14b disposed to travel along a path at an angle to the path of travel of the upper work run. The upper work run 14a and lower work run are connected to each other by a continuous loop 14c. The work runs 14a and 14b are formed by a guide means including a first elongated pulley 18 arranged for rotation about a generally horizontal axis. The first pulley 18 is supported by a pair of bearings 20, each of which is secured to a pad 22 which in turn is fixed to a vertical leg 23 of a ground supported support structure 24. The first pulley 18 is arranged to define the discharge end of the upper work run 14a. The conveyor belt 12 extends over the first pulley 18 to a second elongated pulley 26 arranged below the first pulley for rotation about a generally horizontal axis parallel to the axis of the first pulley. The second pulley 26 is mounted between a pair of bearings 28 each of which is fixed to leg 23 of support structure 24. Conveyor belt 12 continues around the second pulley 26 and is directed upwardly to a third pulley 30 arranged in a plane between the first and second pulleys to rotate about an axis disposed at an angle to the respective axes of the first and second pulleys. The relationship of the respective longitudinal and transverse axes of the second and third pulleys 26 and 30 is shown in FIG. 8. The conveyor belt 12 is twisted between the region where it leaves the second pulley 26 and where it engages the third pulley 30. The conveyor belt 12 continues over the third pulley 30 to become the lower work run 14b which advances downstream along a path at an angle to the upper work run 14a. The third pulley 30 is supported for rotation by bearings 32 each of which is secured to a vertical leg 34 of support structure 36. The third pulley 30 defines the receiving end of the lower work run 14b which as shown is at a reasonably short vertical distance (viz. one foot) from the discharge end of the upper work run 14a.

The upper work run 14a is supported by idler assemblies 40 longitudinally spaced along the run, the ends of the idlers being supported in bearings 42 secured to horizontal structural members 44 forming part of support structure 24. Material being conveyed by the upper work run 14a will be discharged onto lower work run 14b at the transfer point. A deflector chute 46 is arranged between the discharge end of upper work run 14a and the receiving end of lower work run 14b to guide the material from the upper to the lower work run. The deflector chute 46 is fixed to members 48 and 50 which in turn are fixed to horizontal members 52 and 54 forming part of support structure 36. The lower work run 14b is supported by idler assemblies 56 longitudinally spaced along the length of the run. The idlers of the assemblies 56 are supported by bearings 58 fixed to the horizontal members 52 and 54.

Figure 4:
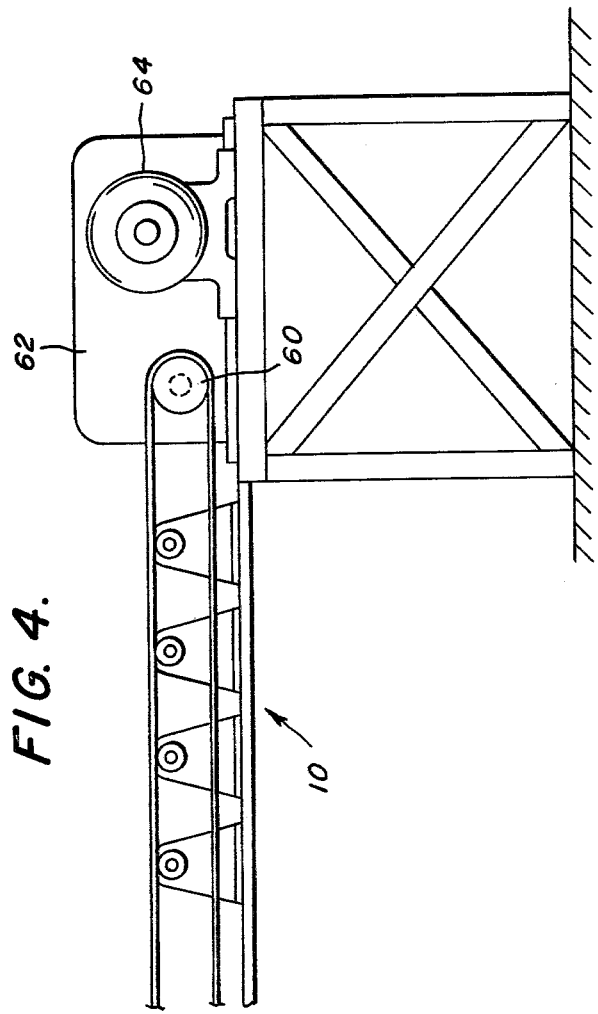
FIG. 4 is a view looking along the line IV—IV of FIG. 3.

The lower run 14b continues downstream to either a final discharge point for the material, or the lower run becomes an upper run for another angular tranfer as is shown in FIGS. 3 and 4. A drive mechanism is provided at the final discharge point and includes a drive pulley 60 coupled to the shaft of a reducer 62 which in turn is coupled to a motor 64 connected with a source of electricity, not shown.

The conveyor belt 12 is turned around the drive pulley 60 where it becomes the return portion 16. Referring back to FIG. 1, there is shown a guide means for changing the direction of the return portion 16 whereby there is defined a first return run 16a having its path of travel lying in a common vertical plane with the lower work run 14b and a second return run 16b having its path of travel lying in a common vertical plane with the upper work run 14a. The guide means for the return run 16 includes a fourth elongated pulley 70 arranged to rotate about an axis generally parallel to the axis of the third pulley 30 of the work portion guide means. The fourth pulley 70 is supported for rotation by bearings 72, each of which is mounted on a horizontal member 74 fixed between vertical legs 34 and 76 of support structure 36. The conveyor belt 12 continues over fourth pulley 70 downwardly to a fifth elongated pulley 80 arranged with its axis of rotation generally parallel to the axis of the fourth pulley 70. The fifth pulley 80 is supported for rotation by bearings 82, each of which is secured to a vertical leg 34 of support structure 36. The conveyor belt 12 continues around the fifth pulley 80 and upwardly to a sixth elongated pulley 90 arranged with its axis of rotation at an angle to the axis of the fifth pulley 80. The axis of the sixth pulley 90 is also generally parallel to the respective axes of the first pulley 18 and second pulley 26 of the work run guide means. The conveyor belt 12 is twisted between the fifth pulley 80 and sixth pulley 90 and extends over the sixth pulley to travel along a path lying in a common vertical plane with the path of travel of the upper work run 14a. The conveyor belt 12 continues over the sixth pulley 90 and upwardly to a seventh elongated pulley 100 disposed with its axis of rotation extending generally parallel to the axes of sixth pulley 90 and first pulley 18 and second pulley 26 of the work run guide means. The conveyor belt 12 then continues over seventh pulley 100 along a path parallel to that of upper work run 14a. The seventh pulley 100 is supported for rotation by bearings 102, each of which is fixed to a horizontal member 104 arranged between vertical legs 23 and 25 forming part of support structure 24. Thus, the guide means for the return portion 16 is arranged to form the first return run 16a and second return run 16b both connected by a continuous loop 16c. The angular relationship between the respective longitudinal and transverse axes of the fifth pulley 80 and sixth pulley 90 is shown in FIG. 9.

The pulleys forming the respective work portion and return portion guide means are arranged to maintain the work run loop 14c and return run loop 16c always in a taut condition whereby the work and return runs are maintained taut.

The return portion 16 of the conveyor belt 12 continues its movement towards the feed end of the conveyor apparatus 10 which includes a bearing supported idler pulley 106 as shown in FIG. 3. The conveyor belt 12 then turns around the feed end idler pulley 106 to again become the work portion 14.

Various arrangements of the pulleys forming the guide means for the work and return portions of the conveyor belt 12 are possible for providing angular transfers of different desired angles. The pulley arrangement described with respect to the conveyor apparatus 10 of FIGS. 1 and 2 provides an angular transfer of a somewhat small angle (viz. 6 degrees). FIGS. 5-7 schematically show a pulley arrangement for a ninety degree transfer. The upper work portion 214 of the conveyor belt 212 is shown as travelling from left to right in FIGS. 5 and 6. The conveyor belt 212 turns around pulley 220 which defines the discharge end of upper work run 214a and then extends backwardly to pulley 230 where it extends downwardly to pulley 240, thence around that pulley where it proceeds upwardly and takes a sharp twist around pulley 250 arranged ninety degrees to the other pulleys. As the conveyor belt 212 emerges from pulley 250 it becomes the lower work run 214b. A vertically arranged deflector chute 255 is disposed to guide material from the discharge end of the upper work run 214a onto the receiving end of the lower work run 214b.

The return portion 216 of conveyor belt 212 moves into the view of FIG. 6, with the belt being directed around pulley 260 and therearound downwardly to a sharp twist to engage pulley 270 disposed ninety degrees to pulley 260. The conveyor belt 212 is directed around pulley 270 and upwardly to pulley 280 arranged generally parallel to pulley 270. The conveyor belt 212 is directed around pulley 280 and thence towards the feed end of the conveying apparatus.

It should now be apparent how the conveying apparatus of my present invention provides the new results and advantages described in the introductory portion of this specification. It should also be apparent that the pulleys of the work and return portion guide means may be arranged in many ways to obtain various angular transfer arrangements between the work runs of a conveyor belt, and that this may be achieved using a single drive mechanism.

The angular change in direction of travel from the first work portion to the second work portion is effected by angling the second guide roller relative to the looping roller, so that the travel path is adjusted as the conveyor advances from the looping roller to the second guide roller.

While I have shown and described a present preferred embodiment of this invention it is to be distinctly understood that the invention is not limited thereto but may be otherwise variously embodied within the scope of the following claims.

I claim:

1. A conveying apparatus, comprising:
   an endless conveyor belt having an upper work portion and a lower return portion;
   at least one first guide means for guiding the upper work portion of said belt to provide first and second work runs having their paths of travel lying at an angle to each other, the discharge end of said first work run lying in a plane above the receiving end of said second work run, with the work runs being connected by a connecting loop,
   said first guide means including a first elongated guide member at the discharge end of said first work run, a second elongated guide member at the receiving end of said second work run with its longitudinal axis at a preselected horizontal angle with respect to the longitudinal axis of the first guide member and a third elongated guide member disposed below the second guide member with the longitudinal axis thereof parallel to the longitudinal axis of the first elongated guide member, the longitudinal axes of said first, second and third guide members being perpendicular to the longitudinal axis of the endless conveyor belt, and said second and third guide members being aligned such that the endless conveyor belt moves vertically between said third guide member and the second guide member and is, therefore, twisted from the direction of travel of the first work portion to the direction of travel of the second work portion about a vertical axis; and
   at least one second guide means for guiding the return portion of said conveyor belt.

2. The conveying apparatus as set forth in claim 1 wherein said guide members are in the form of elongated rollers.

3. The conveying apparatus as set forth in claim 1 including deflector means for guiding material from said first work run to said second work run.

4. The conveying apparatus as set forth in claim 1 wherein said second guide means is constructed and arranged to provide first and second return runs connected by a downwardly extending loop, the first return run disposed to have its direction of travel lying in a plane including the direction of travel of said second work run, and the second return run disposed to have its direction of travel at an angle to that of the first return run and in a plane including the direction of travel of said first work run; said second guide means including a fourth elongated guide member disposed below and generally vertically aligned with and parallel to said second guide member of said first guide means, and a fifth elongated guide member disposed below said third guide member of the first guide means and generally vertically aligned with and parallel to said third guide member, said fourth and fifth guide members being vertically displaced from one another and also being constructed and arranged to hold the loop of said return run taut.

5. The conveying apparatus as set forth in claim 1, wherein said second guide member of the first guide means is substantially vertically aligned with the first guide member and wherein said first guide means includes another elongated guide member arranged between said first and third guide members with the axis of said another guide member being generally parallel to the axis of said first guide member, said another guide member being horizontally displaced back under the first work run to provide horizontal displacement of the work run between the first and third guide members to accommodate said second guide member.

* * * * *